United States Patent [19]
Wakahara

[11] 3,936,167
[45] Feb. 3, 1976

[54] DEVICE FOR AUTOMATICALLY CONTROLLING A PROTECTIVE FILTER IN A FILM PROJECTOR

[75] Inventor: Shigeo Wakahara, Yokohama, Japan

[73] Assignee: Nippon Kogaku K.K., Tokyo, Japan

[22] Filed: Aug. 20, 1974

[21] Appl. No.: 499,079

[30] Foreign Application Priority Data
Aug. 24, 1973  Japan.............................. 48-94275

[52] U.S. Cl. ................................. 352/148
[51] Int. Cl.² .......................................... G03B 21/16
[58] Field of Search .......... 352/146, 147, 148, 152, 352/153, 154, 155, 17

[56] References Cited
UNITED STATES PATENTS
1,385,162   7/1921   Tillyer................................. 352/148
1,954,844   4/1934   Scheinfeld .......................... 352/154

Primary Examiner—Monroe H. Hayes
Attorney, Agent, or Firm—Shapiro and Shapiro

[57] ABSTRACT

In a film projector of the type wherein film advance is controlled by pulse signals generated by a tape recorder or the like, a protective filter is automatically inserted into the optical path between the projection lamp and the film when the time interval between successive pulse signals exceeds a predetermined time limit. The filter is automatically removed from the optical path only when two successive time intervals have a duration less than a predetermined duration.

6 Claims, 2 Drawing Figures

DEVICE FOR AUTOMATICALLY CONTROLLING A PROTECTIVE FILTER IN A FILM PROJECTOR

BACKGROUND OF THE INVENTION

This invention relates to film projectors, and is more particularly concerned with a device for inserting a film-protective filter into the light path of a projector during still projection of a cinematographic film into the light path of a projector during still projection of a cinematographic film or during prolonged projection of film slides or the frames of a film strip.

In the synchronized operation of a film projector of the type wherein film advance is controlled by pulse signals generated by a tape recorder, for example, if the time interval between one pulse signal and the next is prolonged, the particular film frame or slide being projected can become over-heated by the projection lamp, possibly causing permanent damage to the film. It has been proposed to insert a lightattenuating, heat-blocking filter into the light path between the projection lamp and the film to alleviate this condition, but is has not been possible heretofore to provide automatic insertion of such a filter when required to prevent film damage. Moreover, it has not been possible to control the automatic insertion and removal of such a filter in a manner which avoids unduly frequent variation of projected light levels.

SUMMARY OF THE INVENTION

It is accordingly an object of the present invention to provide a novel device for automatically controlling the insertion of a filter in the optical path of a film projector, and for automatically controlling the removal of the filter.

Another object of the invention is to provide an improved device of the above-described type for use in a projector of the type wherein film is advanced in response to pulse signals generated by a tape recorder or the like.

A filter control device in accordance with the invention is responsive to the time periods during which film frames remain stationary in the light path of the projector for causing insertion of a film-protective filter into the light path between a projection lamp and the filim when a film frame is projected for a prolonged period, such as during still projection of motion picture film, and for removing the filter from the light path when the film frames are sequenced at a relatively rapid rate, as during motion picture projection. When the device is employed in a projector of the type wherein film is advanced in response to film advance signals generated by a tape recorder or the like, insertion and removal of the filter may be controlled in accordance with the detected duration of the time intervals between successive film advance signals. In the preferred device, the filter is removed from the light path only after detection of two or more successive time intervals each having a duration less than a predetermined duration.

BRIEF DESCRIPTION OF THE DRAWINGS

The invention will be further discussed with reference to the accompanying drawings, which illustrate a preferred and exemplary embodiment, and wherein.

DESCRIPTION OF THE PREFERRED EMBODIMENT

Figure 1:
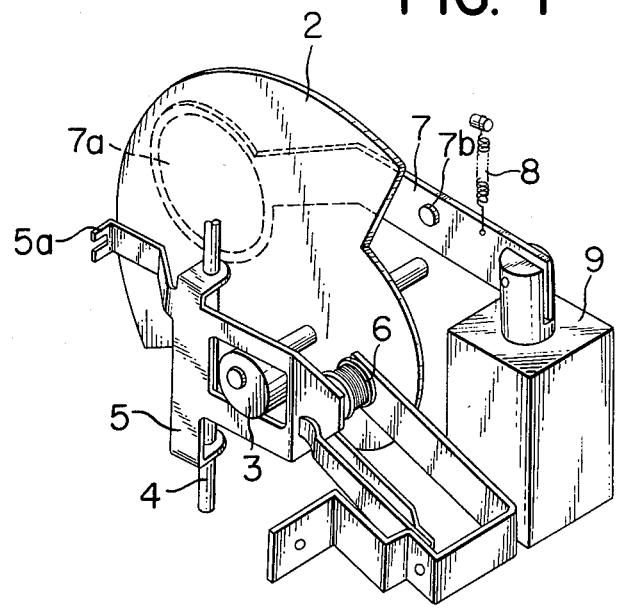
FIG. 1 is a perspective view of the mechanical structure of a filter control device in accordance with the present invention employed in conjunction with a film advance mechanism of a motion picture projector.

Referring to FIG. 1, the mechanical structure of the filter control device of the present invention is shown in conjunction with the film-advancing mechanism of a motion picture projector. A shutter 2 is mounted for rotation with a shutter axle or shaft 1, which has an operating cam 3 fixed at one end thereof. A fixed shaft 4, disposed in a direction perpendicular to the axis of shutter shaft 1, carries a film-feeding pawl 5 which is slidable on shaft 4 as well as rotatable therearound. An electromagnet 6 for actuating the film-feeding pawl 5 is provided near one end of the pawl.

The shutter shaft 1, shutter 2 and operating cam 3 are rotated in a known manner by an electric motor (not shown) at a rate of 54 rps (revolutions per second) so that the film-feeding pawl 5 is caused to slide along shaft 4 in the desired direction of film movement during one half-cycle of rotation of cam 3 and is returned during the next half-cycle of rotation. The electromagnet 6 is energized in synchronism with the sliding movement of the film-feeding pawl, pivoting the pawl about shaft 4 to move end 5a of the pawl into engagement with the perforations of a motion picture film (not shown) to effect film advance.

Disposed behind shutter 2 is a light-attenuating, heat-blocking filter 7a. The filter is mounted at one end of a holding arm 7, which is supported by shaft 7b near the center thereof for rotational movement. A spring 8 connected to the body (not shown) of the projector biases holding arm 7 counterclockwise to hold filter 7a out of the light path between the projection lamp (not shown) and the film. Another electromagnet 9, provided at the extreme end of the hold arm opposite the end having filter 7a, causes the filter to be inserted into the light path against the force of spring 8 which the electromagnet is energized, the filter being removed from the light path by the action of spring 8 when the electromagnet is thereafter de-energized.

Figure 2:
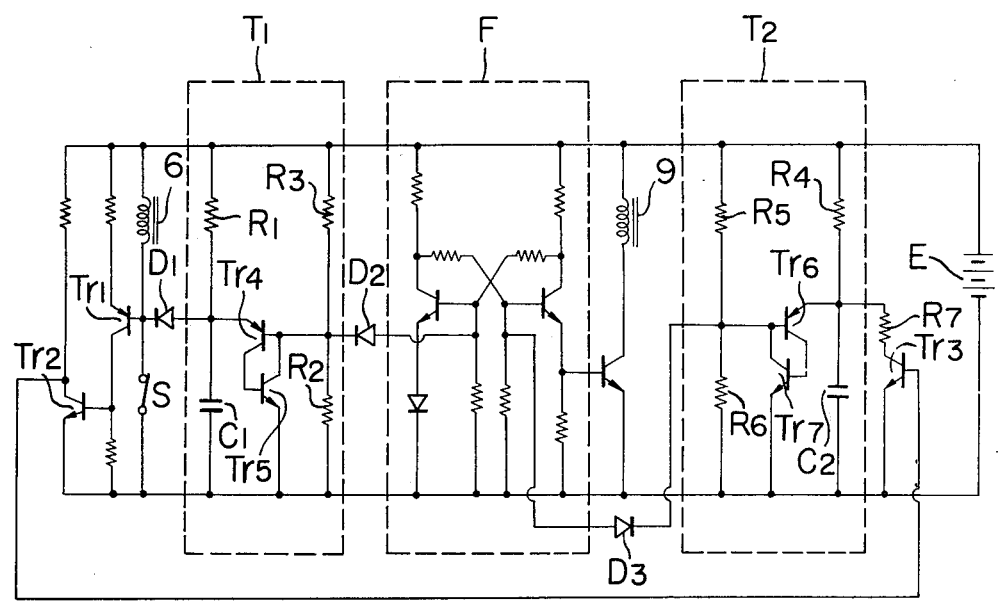
FIG. 2 is a schematic of the electronic circuitry employed in the filter control device of the invention.

Referring to FIG. 2, the electronic circuitry employed in the filter control device of the present invention comprises a first electromagnet 6 for effecting film advance, a second electromagnet 9 for controlling the position of the filter, a switch S, a D.C. power source E, a first detector circuit T1, a second detector circuit T2, and a bistable circuit in the form of flip-flop F. Switch S is closed in a known manner during the occurrence of film advance signals, such as pulse signals, which are produced by a tape recorder or the like and which last until the film has been advanced a complete frame by operation of film-feeding pawl 5.

Operation of the filter control device of the invention will now be described. When switch S is initially closed (upon occurrence of a film advance signal), the electromagnet 6 is energized through the switch, which causes the film-feeding pawl 5 to be actuated to advance the film by one frame. At the same time, electric current from the positive side of source E passes through resistor R1 in the first detector circuit T1 and through diode D1 and switch S to the negative side of the source, and any charge stored in capacitor C1 discharges through diode D1 and switch S. The resultant change in potential at the base of transistor Tr1 causes this transistor and transistor Tr2 to become conductive or ON and transistor Tr3 to become non-conductive or OFF, whereupon capacitor C2 in the second detector circuit T2 begins to be charged by source E through resistor R4.

When switch S is thereafter opened (upon completion of the film advance signal), source E begins to charge capacitor C1 in the first detector circuit T1 through resistor R1. At the same time, transistors Tr1 and Tr2 become non-conductive and transistor Tr3 becomes conductive so that capacitor C2 begins to discharge through resistor R7 and transistor Tr3. Capacitor C2 is charged with a time constant C2R4 when switch S is closed and is discharged with a time constant C2R7 when switch S is open.

The capacitance of capacitor C1 and the resistance of resistor R1 are selected such that the voltage across the capacitor exceeds a reference potential at the junction of resistors R2 and R3 only if the time interval between one film advance signal and the next exceeds a predetermined time limit, as may occur during still projection of motion picture film, for example. In the case when capacitor C1 is charged to a voltage in excess of the reference potential, a switching circuit formed by transistors Tr4 and Tr5 in detector circuit T1 becomes conductive, causing a SET signal to be applied through diode D2 to a SET input of flip-flop circuit F. Electromagnet 9, which is connected to an output of the flip-flop circuit, is thus energized to cause film-protective filter 7a to be inserted into the light path between the projector lamp and the film.

Filter 7a will remain in the light path until flip-flop F is reset and electromagnet 9 de-energized. The production of a RESET signal requires that capacitor C2 be charged to a value exceeding a reference potential at the junction of resistors R5 and R6. Then a switching circuit comprising transistors Tr6 and Tr7 in detector circuit T2 becomes conductive, causing a RESET signal to be applied through diode D3 to a RESET input of the flip-flop circuit F. The state of the flip-flop circuit is reversed thereby, which causes electromagnet 9 to become de-energized, so that the filter is removed from the light path by spring 8.

When, after the filter has been inserted into the light path, the time intervals between successive film advance signals remain long, as in the case of still projection of successive frames of motion picture film, the discharge time of capacitor C2 (when film advance switch S is open) is so prolonged relative to the charging time of the capacitor (when switch S is closed) that the voltage across the capacitor remains low. Thus, detector circuit T2 cannot produce a signal for resetting the flipflop circuit, with the result that the filter remains in the light path.

In the preferred embodiment it is desired to avoid unduly frequent variations of projected light levels, as might occur if the filter were inserted and removed frame-by-frame during still projection of successive frames of motion picture film depending upon individual frame projection duration. Once the filter is inserted during still projection, it is desired that removal occur only when rapid frame sequencing begins, as when motion picture projection is resumed. In accordance with the invention, this is achieved by selecting the values of C2, R4 and R7 such that the voltage on the capacitor exceeds the reference potential at the junction of resistors R5 and R6 only when several (preferably two) successive time intervals between film advance signals have a duration less than a predetermined duration.

In summary, the filter control device constructed in accordance with a preferred embodiment of the invention detects the time periods between successive film advances. A heat-blocking, light-attenuating filter is inserted into the light path whenever a detected time period exceeds a predetermined time limit, such as during still projection of motion picture film. The filter is removed from the light path after detection of two or more successive time periods each having duration less than a predetermined duration.

While a preferred embodiment of the invention has been shown and described, it will be apparent to those skilled in the art that changes can be made in this embodiment without departing from the principles and spirit of the invention, the scope of which is defined in the appended claims.

The invention claimed is:

1. A filter control device for a film projector of the type in which film is advanced in response to film advance signals, comprising:
    means for detecting the time intervals between successive film advance signals; and
    control means responsive to said detecting means for causing insertion of a filter into the light path between a projection lamp of said projector and said film when a detected time interval exceeds a predetermined time limit.

2. A device as set forth in claim 1, wherein said control means includes means for causing the removal of said filter from said light path only when the duration of a certain number of said time intervals greater than one is less than a predetermined duration.

3. A device as set forth in claim 1, wherein said control means comprises means for causing removal of said filter from said light path only after detection of successive time intervals each of which has a duration less than a predetermined duration.

4. A device as set forth in claim 3, wherein said detecting means comprises means for generating a first signal when a detected time interval exceeds said predetermined time limit and means for generating a second signal after detection of said successive time intervals, and wherein said control means comprises bistable circuit means having said first and second signals applied to its set and reset inputs, respectively, and an electromagnet connected to an output of the bistable circuit means for controlling the insertion and removal of said filter, depending upon the state of said bistable circuit means.

5. A device as set forth in claim 4, wherein said detecting means comprises first and second detector circuits for generating said first and second signals, respectively, and wherein said detector circuit comprises a capacitor, means for charging and discharging said capacitor in response to said film advance signals, and switching means connected to the capacitor for providing the associated signal when the voltage on said capacitor exceeds an associated reference potential.

6. A device as set forth in claim 5, wherein said charging and discharging means comprises means for charging the capacitor in said first detector circuit and discharging the capacitor in said second detector circuit in the time intervals between said film advance signals and for discharging the capacitor in said first detector circuit and charging the capacitor in said second detector circuit during said film advance signals.

\* \* \* \* \*